Figure 1:
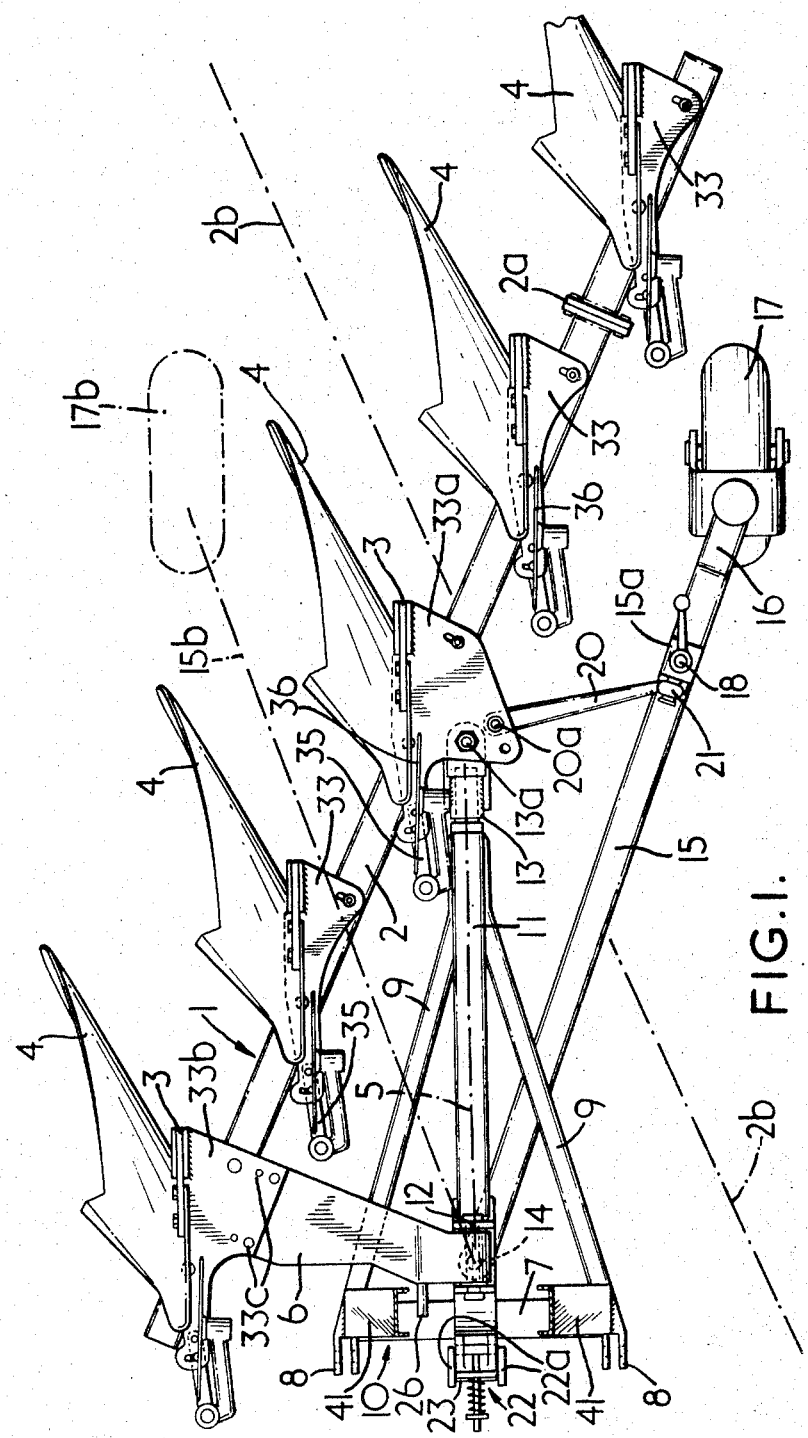

United States Patent [19]

Dowdeswell

[11] 3,730,279

[45] May 1, 1973

[54] REVERSIBLE PLOUGH SUPPORT MEANS WITH ALTERNATELY LATERALLY SWINGING WHEEL SUPPORT ARM

[76] Inventor: Charles Vernon Roger Dowdeswell, Lower Radbourne Farm, Southam, England

[22] Filed: Feb. 9, 1971

[21] Appl. No.: 113,942

[52] U.S. Cl. ............................ 172/212, 172/225
[51] Int. Cl. ................................................. A01b 3/42
[58] Field of Search ............. 172/204, 212, 218–219, 172/223–225, 232, 449, 677, 679

[56] References Cited

UNITED STATES PATENTS

| | | | |
|---|---|---|---|
| 3,604,516 | 9/1971 | Maxwell | 172/225 |
| 3,554,294 | 1/1971 | Morkoski | 172/225 |
| 2,672,801 | 3/1954 | Barrett | 172/212 |
| 2,675,749 | 4/1954 | Pursche | 172/212 |
| 2,704,020 | 3/1955 | Wilson | 172/449 |
| 3,193,306 | 7/1965 | Pettit | 172/449 |

FOREIGN PATENTS OR APPLICATIONS

| | | | |
|---|---|---|---|
| 950,912 | 2/1964 | Great Britain | 172/212 |
| 1,091,064 | 11/1967 | Great Britain | 172/225 |
| 1,164,355 | 10/1958 | France | 172/225 |

*Primary Examiner*—Robert E. Pulfrey
*Assistant Examiner*—C. W. Hanor
*Attorney*—Watson, Cole, Grindle & Watson

[57] ABSTRACT

Support means for a reversible plow comprising a support structure for connection to a tractor, which structure has a rearwardly extending beam on which a plow frame including a plow share carrying boom is pivotally mounted about a longitudinal turning axis and such that the boom is inclined to the beam, an arm being provided pivotally connected about a vertical axis to the support structure and extending rearwardly and longitudinally along with the boom and pivotally connected by a link at its rear part to a central region of the boom, the arm also carrying at its rear end a tail wheel support having a castor action whereby, as the plow frame is turned over by ram operation for plow reversal, opposite lateral swinging movement is imparted to the arm for providing corresponding tail wheel support of the boom alongside the latter in accordance with the operative position to which the plow frame is turned.

4 Claims, 3 Drawing Figures

Patented May 1, 1973

3,730,279

3 Sheets-Sheet 2

INVENTOR:
CHARLES VERNON ROGER DOWDESWELL

BY
Watson Cole, Grindle & Watson
ATTORNEY

REVERSIBLE PLOUGH SUPPORT MEANS WITH ALTERNATELY LATERALLY SWINGING WHEEL SUPPORT ARM

This invention refers to agricultural ploughs of the type known as reversible ploughs in which two series of ploughshares are carried by a plough frame which is arranged to be turned over the present one or the other series of ploughs to the ground as the plough frame is drawn by a tractor, the rearward end of the frame being normally supported in an operative position by a rear or tail wheel.

The object of this invention is to provide a simple form of support means for a reversible plough which is self adapting in an automatic manner for supporting the plough frame as the latter is changed or reversed from one operative ploughing position to the other. This and other practical advantages will be apparent from the following detailed description of the invention.

Figure 2:
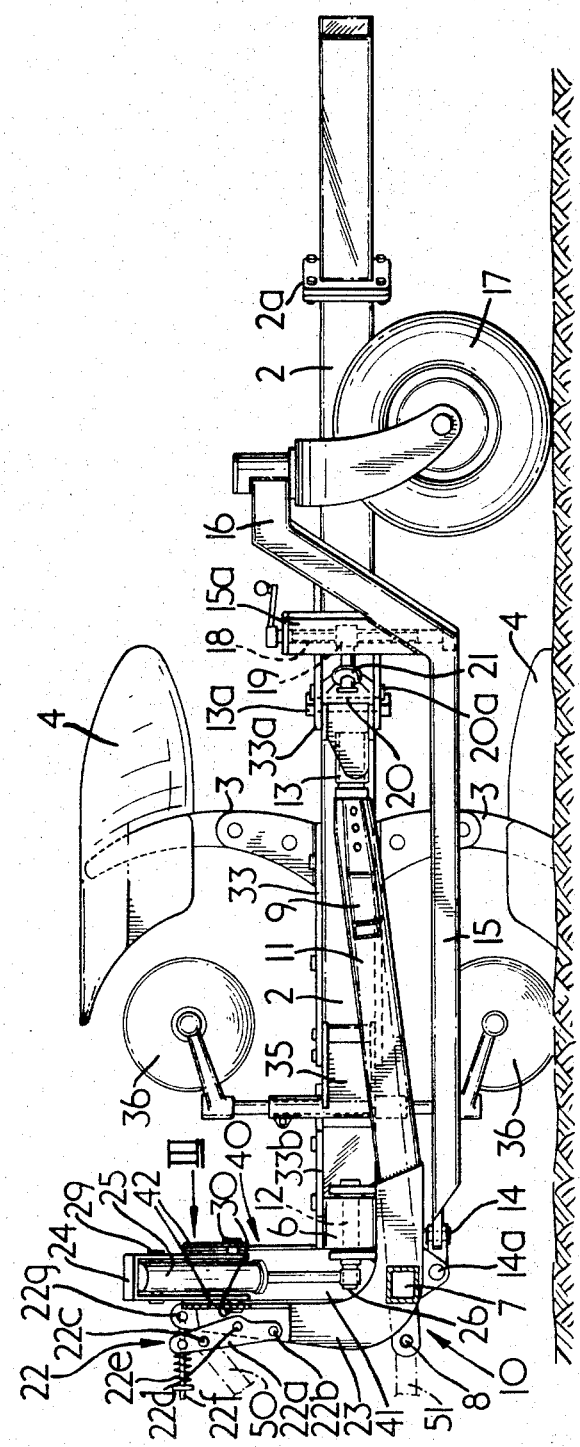
Figure 3:
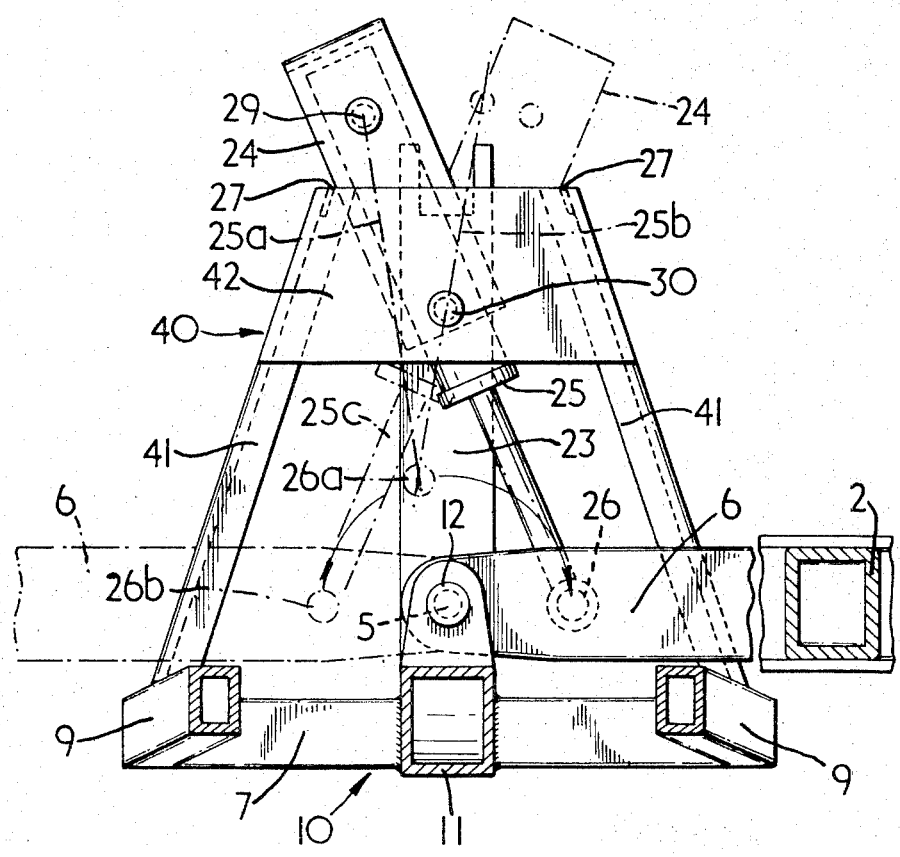

In a practical embodiment of the invention, the construction and arrangement is as follows, reference being had to the accompanying drawings in which:

FIG. 1 is a plan view of the plough support means,
FIG. 2 is a side elevation thereof, and
FIG. 3 is a detail view indicating plough reversal ram operation and taken in the direction of the arrow III in FIG. 2.

The plough frame 1 is shown comprising a rearwardly inclined boom 2 from which ploughshare support legs 3 extend for mounting two series of, for example, four, or as indicated, five ploughshares 4 in rearwardly inclined staggered formation, one series of ploushshares being downwardly directed from the frame for multi-furrow ground ploughing while the other series extend upwardly in an inoperative position (FIG. 2). When the plough frame 1 is reversed i.e. turned about a longitudinal axis 5 through 180° or thereabouts, the previously inoperative series of ploughshares are brought to a ploughing position and the other series raised to the upstanding position.

For clarity only some of the ploughshares 4 are shown in the drawings while the rear part of boom 2 is shown readily detachable at 2a for enabling the fifth or rearmost ploughshares of each series to be removed as a unit when only four ploughshares per series are required. Each pair of plough legs 3,3 is shown mounted by brackets or mounting plates 33,33a or 33b from boom 2 which latter is preferably of rectangular hollow section for the purpose.

For pivotal mounting of the plough frame 1 the forward part thereof is in effect of right angled triangular form of which the forward part of boom 2 forms the hypotenuse while one side is represented by the longitudinal turning axis 5 of forward and rearward pivotal mountings 12,13 from supporting structure 10 with the other side provided by a member 6 constituting a forward piece of the plough frame.

For mounting from the usual three point implement linkage 50,51 of an agricultural tractor, e.g., of the crawler or track laying type, the supporting structure 10 is shown consisting of a forward cross beam 7 for connection at 8 to the lower pair of links 51 to the three point linkage, which cross beam 7 has a central rearwardly extending beam 11 from which the plough frame 1 is pivotally mounted at 12,13 about its longitudinal axis 5. The beam 11 is shown braced from the cross beam 7 by stays 9 diverging from the rear end of the beam 11 to the cross beam 7.

The rear pivotal mounting 13 has a pivotal connection 13a at right angles to the mounting bracket or plates 33a for the third ploughshare 4 of each series from the boom 2. This arrangement has the desirable feature that the main tractive force on the boom 2 is effected substantially centrally of the latter, viz, at 13a.

Pivotally connected about a vertical axis at 14 to a forward part of the beam 11 of the supporting structure 10 is the forward end of a longitudinally extending arm 15 which carries at its rear end tail wheel support 16 for the plough frame 1, the rear or tail wheel 17 having a castor action which may be mounted for vertical adjustment for plough depth setting purposes or is in effect vertically adjustable as hereinafter described.

The pivotal connection 14 of the arm 15 to the beam 11 is shown including a transverse pivotal connection 14a so as to provide universal pivotal connection to the arm 15 to the beam 11.

A rear end part of the arm 15 is pivotally connected at 15a by a joint 21 such as a ball joint having a universal action and a pivoted link 20 with the plough frame boom 2 which extends rearwardly from the forward part of the frame 1. The link 20 is pivotally connected at 2a to the boom 2 by means of the bracket 33a.

As shown in FIG. 1, and when the plough frame 1 with its rearwardly inclined boom 2 is in one operative position, the tail wheel carrying arm 15 is rearwardly inclined in a more or less complementary manner to the boom 2 from its pivotal connection 14 to the beam 11 in order to provide tail wheel support 16 at or alongside the rear end part of the boom 2. When the plough frame 1 is turned through 180° in order to reverse the plough 4 such as by hydraulic operation hereinafter described, the turning movement of the frame 1 about its longitudinal axis 5 causes the arm 15 to swing about its pivotal connection 14 in an opposite manner so as to move or swing the tail wheel 17 laterally for support of the rear end part of the boom 2 having regard to the oppositely directed rearward inclination of the latter in the other operative position as indicated in dotted lines at 2b, 15b, 17b in FIG. 1.

Such swinging movement of the arm 15 and tail wheel 16 is effected by the linkage at 20 of the arm 15 to the boom 2, the link 20 assuming an upstanding position with the arm 15 directly under the boom 2 when the boom 2 is in a raised position substantially midway between either operative ploughing position, i.e. with the two series of legs 3 and ploughshares 4 extending laterally in opposite directions and well clear of the ground.

When effecting changeover or reversal of the plough frame 1 and also turning round of the tractor and plough at the end of a ploughing run, i.e. on a headland, the supporting structure 10 and frame 1 is raised clear of plough engagement with the ground by the three point linkage 50,51 of the tractor, the upper link 50 of which is pivotally connected or linked at 22 to a forward upright 23 from the beam 11 of the supporting structure 10.

During the turning of the tractor and plough on a headland the boom 2 is also raised to the abovementioned midway position in the course of effecting plough reversal so that the ploughshares 4 are fully clear of the ground. More particularly, when using four ploughshares 4 per series, the entire assembly, viz the plough frame 1 and supporting structure 10 including the tail wheel 17, can be raised clear of the ground by the three point linkage 50,51 as a fully mounted unit during turning of a headland. However, when using five ploughshares 4 per series or a heavy plough assembly, the tail wheel 17 preferably remains in permanent contact with the ground to provide a semi-mounted unit with provision for articulative movement at 22 as hereinafter described. When semi-mounted in this way and with the supporting structure 10 raised by the three point linkage 50,51 and also the boom 2 raised to the midway position, the entire assembly is in the optimum general position for travelling with the tractor, e.g. from one field to another or along a road.

The connection 22 of the upper link 50 of the tractor three point linkage to the upright 23 is effected via a pair of links 22a pivoted at 22b to the upright 23, the link 50 being pivotally connected at 22c to the links 22a. When the links 22a are free to pivot at 22b articulation is provided in a vertical plane between the link 50 and upright 23, i.e. for semi-mounted operation or travelling but, when fully mounted operation is required, the links 22a are locked fast with the upright 23 by a removable pin at 22d. During articulative pivotal movement the links 22a are preferably spring loaded towards the upright 23, i.e. by compression springing 22e about a rod 22f pivotally connected at 22g to the top of the upright 23.

Turning of the plough frame 1 for plough reversal is shown effected by hydraulic ram operation (FIGS. 2 and 3) in which a ram 25 is pivotally carried by a crank link or stirrup 24 from upstanding support 40 fast with the upright 23 on the supporting structure 10, and is pivotally connected at its other end at 26 to the forward cross piece 6 of the plough frame 1 whereby, on retraction of the ram 25, the plough frame 1 is raised to the midway position about its longitudinal pivotal mounting 12,13 to swing over to its other operative position with an over center action of the ram 25 and crank 24. Thus when at the midway position above referred to, the plough frame 1 is always at an over center position in relation to the axis 5 in one direction or the other. For clarity the ram 25 and crank 24 are not shown in FIG. 1.

The upstanding support 40 (FIGS. 2 and 3) is shown comprising mutually inclined members 41 extending upwardly from corresponding end parts of the cross beam 7 of the supporting structure 10 and united at their upper ends by a pair of cross plates 42 between which the inverted stirrup form crank 24 is located and pivoted at 30 to each plate 42. The cylinder of the ram 25 is accommodated between the limbs of the crank 24 and pivoted to the latter at 29. The forward plate 42 is secured to the upright 23 so that the support 40 is rigid therewith.

FIG. 3 includes a diagrammatic showing of the action of the ram 25 and crank 24 which are shown operating between limit stops 27, 27 provided by the upper ends of the members 41. In swinging the plough frame 1 from the right to left (FIG. 3), the extended ram 25 is contracted and by such action lifts its pivotal connection 26 to the plough frame cross member 6 through an arc to the upper over center position 26a, the retracted condition of the ram being indicated at 25a.

On commencement of extension of the ram at 25a the latter together with the crank 24 initially move over center to an in line position indicated at 25b while on continued extension of the ram to the fully extended condition, the in line position of the ram 25 and crank 24 is at 25c with the pin 26 at 26b, i.e., for complete reversal or turn over movement of the plough frame 1. For reversal in the opposite direction, the converse of that just described occurs with over center movement of the ram 25 and crank 24 from one stop 27 to the other 27 on ram extension.

To avoid violent turnover of the plough frame 1 the ram 25 should have a restricted rate of extension.

Simply by operation of the tractor linkage and the ram 25 for effecting change over of the plough frame position, plough reversal can be readily effected at the end of a ploughing run with tail wheel support 16 automatically moved to the required position by the swinging action of the arm 15 carrying it.

The support 16 for the tail wheel 17 is shown upwardly cranked in a fixed or integral manner from the arm 15 while for effecting plough depth adjustment in relation to the tail wheel 17, the pivotal or ball joint connection 21 of the link 20 to the arm 15 is vertically adjustable relative thereto by screw and nut mechanisms 18,19 carried by a fixed pillar at 15a upstanding from the arm 15, the screw 18 being operable at the top of the pillar 15a.

By alternative bolting 33c of the mounting bracket plates 33b of the first or leading plough-share 4 of each series relative to the cross member 6 of the plough frame 1, the angle of the boom 2 in relation to the general fore and aft axis of the plough and tractor can be set for obtaining suitable offset of the tractor from the furrow wall of a previous ploughing run, i.e., according to operating conditions. Such angular setting of the boom 2 is effected about the pivotal connection 13a to the ploughshare mounting bracket 33a. The ploughshare mounting brackets or plates 33, 33a and 33b are secured or bolted to the boom 2 to suit required furrow width e.g. 10 inches (25.5cm) 12 inches 30.5cm) or 14 inches (35.5cm) wide and may be arranged for alternative fixing or bolting on the boom 2 for this purpose.

The brackets or plates 33,33a and 33b are also shown carrying support arms 35 for discs 36 associated with the ploughshares 4.

It is to be understood that the construction herein described with reference to the accompanying drawings may be varied within the scope of the invention herein defined, while any values quoted are given by way of example only.

I claim:

1. Reversible plow support means comprising a support structure for connection to a tractor and having a central rearwardly extending longitudinal beam; a plow frame comprising a forward cross piece united to the forward end of a plowshare carrying boom, the cross piece and a central region of the boom being pivotally mounted about a common longitudinal turning axis on the beam of the support structure respectively at forward and rear parts of the beam, the cross piece, a forward portion of the boom and the beam defining a triangular formation such that the boom is inclined relative to the beam with rearward extension of the remainder of the boom beyond the rear end of the beam; ram means connected and acting between the support means and cross piece for effecting a turnover of the plow frame about said turning axis for plow reversal; an arm pivotally connected at its forward end about a vertical axis to the support structure and extending rearwardly and angularly along with the boom; a link pivotally connecting a rear part of the arm to the boom at substantially said central region of the latter; and tail wheel support means pivotally carried about a vertical axis only at the rear end of the arm so as to have a castor action whereby, as the plow frame is turned over for plow reversal, opposite lateral swinging movement is imparted to the arm for providing corresponding tail wheel support of the boom alongside the latter in accordance with the operative position to which the plow frame is turned.

2. Reversible plow support means according to claim 1 wherein the ram means comprises a fluid pressure operated ram pivotally connected to the cross piece of the plow frame and pivotally carried by a crank member in turn pivotally carried by an upstanding part of the support structure, said crank member and ram having an over center action in an opposite manner to that of the plow frame on retraction of the ram whereby the ram is positioned to effect continuation of plow frame turning beyond the over center position of said frame by extension of the ram.

3. Reversible plow support means according to claim 1 wherein the plowshare carrying boom is angularly adjustable at its central region about a pivotal connection to the pivotal mounting of the boom on the beam of the support structure, the forward end part of the boom being united to the cross piece of the plow frame by variable connection, whereby the angular position of the boom can be set in relation to the general fore and aft axis of the plow support means and of a tractor connected thereto for setting the offset of the tractor in relation to the furrow wall of a previous plowing run.

4. Reversible plow support means according to claim 1 wherein an upstanding part of the support structure is provided with pivotal linkage for connection to a tractor implement linkage in order to provide articulative movement in a vertical plane between the support structure and tractor linkage thereto for use in semi-mounted operation of the plow support means from a tractor, said pivotal linkage being lockable rigidly to the upstanding part of the support structure for non-articulative fully mounted operation of the plow support means from a tractor.

* * * * *